United States Patent [19]
Graham

[11] Patent Number: 5,200,679
[45] Date of Patent: Apr. 6, 1993

[54] ARTIFICIAL HAND AND DIGIT THEREFOR

[76] Inventor: Douglas F. Graham, 2427 Fort Scott Dr., Arlington, Va. 22202

[21] Appl. No.: 483,180

[22] Filed: Feb. 22, 1990

[51] Int. Cl.$^5$ .............................................. B25J 15/08
[52] U.S. Cl. ........................... 318/568.16; 318/568.21; 901/33; 901/36; 901/39
[58] Field of Search ................................ 318/560-630; 364/513; 901/3, 8, 9, 12, 15-25, 36, 39, 33, 31, 35, 41, 47, 37, 39; 414/7, 6, 5, 4

[56] References Cited

U.S. PATENT DOCUMENTS

| | | |
|---|---|---|
| 3,182,813 | 5/1965 | Goodell et al. |
| 3,202,449 | 8/1965 | Lemelson |
| 3,345,647 | 10/1967 | Gentiluomo |
| 3,509,583 | 5/1970 | Fraioli |
| 3,694,021 | 9/1972 | Mullen ........................ 901/36 X |
| 3,751,733 | 8/1973 | Fletcher et al. |
| 4,034,176 | 7/1977 | Larson |
| 4,094,016 | 6/1978 | Eroyan |
| 4,263,485 | 4/1981 | Corwin |
| 4,302,138 | 11/1981 | Zarudiansky |
| 4,351,553 | 9/1982 | Rovetta et al. |
| 4,375,018 | 2/1983 | Petersen |
| 4,493,958 | 1/1985 | Hamilton et al. |
| 4,539,554 | 9/1985 | Jarvis et al. ..................... 310/338 X |
| 4,555,953 | 12/1985 | Dario et al. ...................... 901/33 X |
| 4,555,954 | 12/1985 | Kim .................................. 901/33 X |
| 4,575,297 | 3/1986 | Richter ............................. 901/22 X |
| 4,600,355 | 7/1986 | Johnson ........................... 901/21 X |
| 4,605,354 | 8/1986 | Daly |
| 4,621,331 | 11/1986 | Iwata |
| 4,637,773 | 1/1987 | Nakashima et al. ............ 901/29 X |
| 4,694,231 | 9/1987 | Alvité ............................... 901/33 X |
| 4,695,681 | 9/1987 | Velleman |
| 4,715,773 | 12/1987 | Parker et al. ..................... 901/9 X |
| 4,746,894 | 5/1988 | Zeldman ........................... 901/33 X |
| 4,764,770 | 8/1988 | Church |
| 4,806,066 | 2/1989 | Rhodes et al. ................... 901/9 X |
| 4,834,761 | 5/1989 | Walters ............................ 901/37 X |
| 4,865,376 | 9/1989 | Leaver et al. .................... 901/21 X |
| 4,921,293 | 5/1990 | Ruoff et al. ...................... 901/21 X |
| 4,946,380 | 8/1990 | Lee ................................... 901/21 X |
| 4,955,918 | 9/1990 | Lee ................................... 901/21 X |
| 4,957,320 | 9/1990 | Ulrich .............................. 901/39 X |
| 4,964,302 | 10/1990 | Grahn et al. ..................... 901/46 X |
| 4,980,646 | 12/1990 | Zemel ............................... 901/33 X |
| 4,986,723 | 1/1991 | Maeda .............................. 901/36 X |
| 5,046,375 | 9/1991 | Salisbury, Jr. et al. ........ 901/21 X |
| 5,062,673 | 11/1991 | Mimura et al. .................. 901/34 X |

FOREIGN PATENT DOCUMENTS

| | | |
|---|---|---|
| 245616 | 5/1987 | German Democratic Rep. |
| 51-80919 | 1/1978 | Japan |
| 1047680 | 10/1983 | U.S.S.R. |
| 1074711 | 2/1984 | U.S.S.R. |
| 1252167 | 8/1986 | U.S.S.R. |

OTHER PUBLICATIONS

M. Caporali et al., "Design and Construction of a Five-Fingered Robotic Hand," Robotics Age, Feb. 1984, pp. 14-20.

Primary Examiner—Paul Ip
Attorney, Agent, or Firm—Lowe, Price, LeBlanc & Becker

[57] ABSTRACT

A robotic hand, claw manipulator or a prosthetic device includes plural artificial digits, each having a guide and plural phalanges. First and second cables have a first end fixedly connected to spaced first and second points on a digit distal tip, respectively, and a second end driven by a reversible motor. The cables are positioned and connected to the reversible motor, the two points and a guide arrangement so that in response to the motor being activated in a first direction the first cable exerts a tensile force on the first point and a compressive force on elements of the guide arrangement to cause one of the phalanges to be urged from a bent position toward a straight position and in response to the motor being activated in a second direction the second cable exerts a tensile force on the second point and a compressive force on elements of guide arrangement to cause the phalanx to be urged away from the straight position.

32 Claims, 5 Drawing Sheets

ARTIFICIAL HAND AND DIGIT THEREFOR

TECHNICAL FIELD

The present invention relates generally to robotic hands, claw manipulators or prothesis devices and more particularly to artificial hands of this type having a digit with a pair of cables activated by a reversible drive to cause the digit to be driven between straight and bent positions. In accordance with a further aspect of the invention, an artificial hand includes a digit with a membrane switch sensor.

BACKGROUND ART

Most artificial digits, i.e., fingers and thumbs, developed for robotic hands, robotic claw manipulators and prosthetic devices include mechanical linkages, each employing a spring biased cable pulled in one direction by a mechanical activator to close the digit. In response to release of the activator, the spring pushes the digit back to its initial position, such that the digit is open, i.e., in a straight position. In some cases, separate cables are used for each of several phalanges of a digit. Frequently, actuators for the cables include cams to control digit motion. These prior art devices are usually relatively expensive to manufacture. In addition, they frequently have limited grip strength and severely limit the flexibility of the hand of which they are in part.

It is, accordingly, an object of the present invention to provide a new and improved robotic hand, claw manipulator or hand prosthetic device having improved digits.

Another object of the present invention is to provide a new and improved digit for a robotic hand, robotic claw manipulator or hand prosthetic device.

Another object of the invention is to provide a new and improved robotic hand, claw manipulator or hand prosthetic device that is relatively inexpensive, has a relative high degree of flexibility and improved gripping strength.

A further object of the invention is to provide a new and improved digit for a robotic hand, robotic claw manipulator or a hand prosthetic device, which improved digit enables the hand or claw to be less expensive, have greater flexibility and increased strength.

DISCLOSURE OF THE INVENTION

In accordance with one aspect of the present invention, a digit for a robotic hand, robotic claw manipulator or a hand prosthetic device comprises guide means and plural pivotable phalanges, in combination with reversible drive means for first and second cables. Each of the cables has an intermediate portion extending over pins joining the phalanges. Each cable also includes a first end that is fixedly connected to a point on a tip of the digit and a second end connected to be driven by the reversible drive means, mounted on a metacarpal. One cable extends from a point substantially at the top of the tip over the pin, while the other cable extends from a point substantially at the bottom of the tip under the pin. The cables are positioned and connected to the reversible drive means, the phalanges and the guide means so that (a) in response to the drive means being activated in a first direction the first cable exerts a tensile force on the first point and a compressive force on the guide means in a first direction to cause the phalanges to be urged from a bent position toward a straight position and (b) in response to the drive means being activated in a second direction the second cable exerts a tensile force on the second point and a compressive force on the guide means in the first direction to cause the phalanges to be urged away from a straight position.

Preferably, the reversible drive includes a motor shaft carrying first and second reels on which the first and second cables are wound in opposite directions. In response to the shaft being turned in a first direction, the first and second cables are respectively wound and unwound on the reels and vice versa when the shaft is turned in a second direction. The cables thus function in a manner similar to muscles of a natural digit, i.e., when muscles on the top of a digit contract muscles on the bottom of the digit relax and vice versa. Similarly when the cable at the top of the artificial digit is tensioned (contracted) by being wound on the first reel, the cable at the bottom of the artificial digit is released (relaxed) by being unwound from the second reel.

In accordance with another aspect of the invention, an articulated digit for a robotic hand, a robotic claw manipulator or a hand prosthetic device comprises an articulated digit having plural phalanges. Adjacent ends of the phalanges are connected by a pin. A root of the digit on one of the phalanges is connected to a metacarpal by another pin. The pins have parallel axes between a tip and the root of the digit. A roller on each of said phalanges has an axis parallel to the parallel axes. On the metacarpal are a reversible motor having a shaft and a pair of fixedly mounted guide rollers having a nip. A first cable extends between a first point on the tip and the shaft, through the nip between one side of each of the pins and a side of the rollers facing one side of the pins. A second cable extends between a second point on the tip and the shaft over a second side of each of the pins. The first point, rollers, phalanges, nip and shaft are positioned and arranged so that, in response to the shaft being turned in a first direction, the first cable exerts a tensile force on the first point and a compressive force on the rollers to cause the digit to be urged toward a bent position. The second point, pins, phalanges and shaft are positioned and arranged so that, in response to the shaft being turned in a second direction, the second cable exerts a tensile force on the second point and a compressive force on the pins to cause the digit to be urged toward an open position.

In a preferred embodiment, the first point and nip are on the same side of the finger as the first side of the rollers, while the second point is on the same side of the finger as the second side of the rollers. It is also preferable for end digit to include first and second reels on the shaft. The first cable, connected to the first reel, extends from the same side of the first reel as the first side of the pins. The second cable, connected to the second reel, extends from the same side of the second reel as the second side of the pins.

A robotic hand, robotic claw manipulator or a hand prosthetic device in accordance with the invention includes plural digits, arranged as fingers and a thumb, as specified. Such a hand or manipulator is relatively inexpensive, flexible and is capable of exerting substantial force on grasped and retrieved objects.

Many robotic and prosthetic digits employ sensors in the digit tip. The sensor supplies a signal to a controller in response to an article being grasped by a hand on which the digit is mounted. Currently used sensors generally employ piezo-electric crystals for deriving variable analog voltages as a function of the force exerted against a face of the crystal contacting the grasped article. Processing circuitry responds to the magnitude of the voltage derived by the crystal to convert the voltage to a signal usable for processing by a microprocessor based computer. The prior art devices, while being very versatile, are somewhat expensive and require substantial processing to derive signals suitable for control purposes.

In accordance with a further aspect of the present invention, a digit for an artificial hand includes a relatively inexpensive tactile sensor in a distal tip of the digit. The sensor, basically a membrane switch, is particularly adapted to derive a digital control signal for a computer, without converting an analog voltage amplitude to a digital level. Such a sensor includes a deformable membrane having a metallized region on one side thereof, in combination with electric contact means normally spaced from the metallized region. A pad carried by the tip has a first surface contacting the other side of the membrane and a second surface opposite the first surface. The second surface contacts an object being grasped by the artificial hand so as to be responsive to forces exerted on the tip by the grasped object. The pad is arranged so that in response to the exerted force exceeding a predetermined value the membrane is deflected to cause the metallized region to contact the electric contact means.

Associated with each sensor is an assemblage of several of such pads. The pads and a housing for the sensor are arranged so that different pads in the assemblage can be mounted in the housing at different times. Different ones of the pads have different force responsive characteristics so that the predetermined value of the force changes as a function of which pad in the assemblage is mounted in the housing. Thus, the force characteristics of the sensor can be set to different predetermined values by using inexpensive, replaceable pads. The replaceable characteristic enables the pads easily to be changed as they wear or when foam included in the pads hardens.

In one embodiment, different ones of the pads have different surface characteristics to control the predetermined force value needed to close the metallized region on the electric contact means. In a second embodiment, different ones of the pads have different density characteristics to control the predetermined force value necessary to close the contact.

A further advantage of the sensor arrangement is that the foam rubber pad is basically a non-slip gripping surface. In contrast, piezo-electric crystals are hard, polished surfaces on which a grasped article is likely to slip.

It is, accordingly, still another object of the invention to provide a new and improved sensor for a digit of an artificial hand.

Another object of the invention is to provide a new and improved sensor particularly adapted for generating digital signals in response to forces applied by a grasped object on a tip of a digit of an artificial hand.

An additional object of the invention is to provide a new and improved, relatively inexpensive force responsive sensor for a digit of an artificial hand, wherein transitions in binary signal levels occur in response to different forces exerted by the grasped object on the digit tip.

Still another object of the invention is to provide a new and improved sensor for a tip of a digit of an artificial hand wherein the sensor includes inexpensive, replaceable pads.

Still an additional object of the invention is to provide a new and improved sensor for a tip of a digit of an artificial hand, wherein the sensor has a substantially non-slip gripping surface.

While there has been described and illustrated one specific embodiment of the invention, it will be clear that variations in the details of the embodiment specifically illustrated and described may be made without departing from the true spirit and scope of the invention as defined in the appended claims.

DESCRIPTION OF THE PREFERRED EMBODIMENTS

In describing the preferred embodiments, as illustrated in FIGS. 1-13, anatomical terminology for parts of the hand is employed. For example, the three elongated parts, corresponding to bones, of each digit, i.e., thumb or finger, are referred to as the proximal phalanx, the medial phalanx, and the distal phalanx; these three bones are referred to, in the plural, as phalanges. The portion of the artificial hand between the knuckles connected to the proximal phalanges is referred to as the metacarpal.

Figure 1:
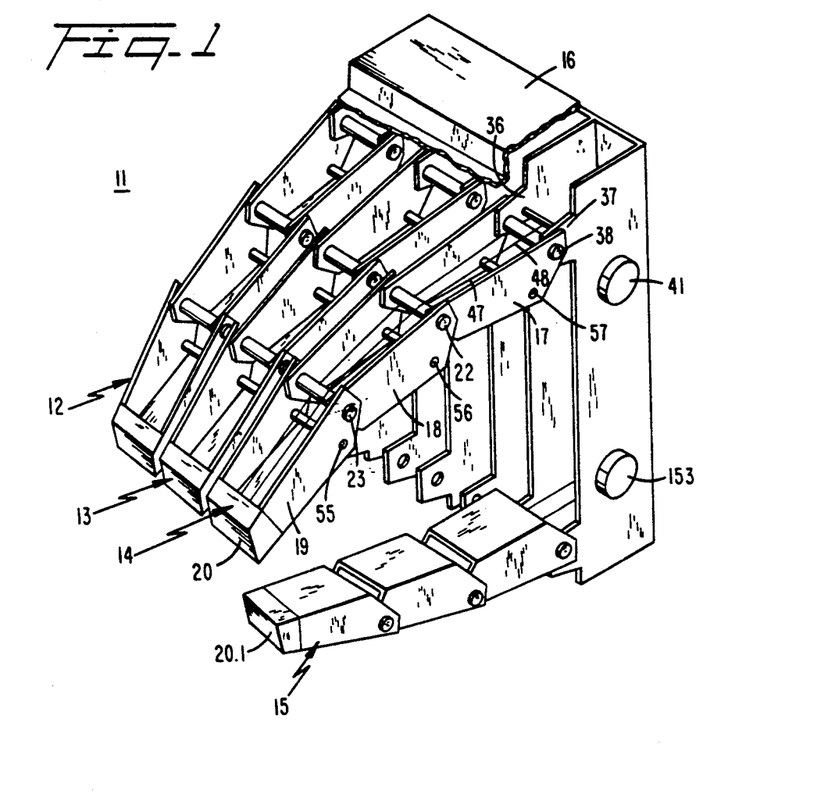
FIG. 1 is a perspective view of a robotic hand including digits according to a preferred embodiment of the invention.

Reference is now made to FIG. 1 of the drawing wherein there is illustrated a perspective view of artificial hand 11 in accordance with the invention. Artificial hand 11 includes three fingers 12, 13 and 14, and thumb 15. Fingers 12-14 extend from the upper portion of metacarpal 16 while thumb 15 extends from the lower portion of the metacarpal. Thumb 15 is generally below finger 14, on the right side of artificial hand 11, as illustrated in FIG. 1. Thumb 15 can be manipulated so that it is below any of fingers 12–14. Alternatively, three fingers in opposite positions from fingers 12–14 can be provided on the bottom of metacarpal 16.

Each of fingers 12–14 and thumb 15 is constructed in substantially the same manner. Hence, finger 14 is described in detail, with differences between the various fingers and thumb 15 being described as needed.

Finger 14 includes U-shaped channel 17 that functions as a proximal phalanx. Opposite ends of channel 17 are connected to metacarpal 16 and U-shaped channel 18 that functions as a medial phalanx. U-shaped channel 19, that functions as a distal phalanx, extends from U-shaped channel 18. At the distal tip of channel 19 is tactile, sensory element 20. In the neutral position of finger 14 illustrated in FIG. 1, the finger curves slightly downwardly from metacarpal 16, with sensory portion 20 facing downwardly. Thumb 15, in the illustrated neutral position, extends slightly upwardly, with sensory portion 20.1 facing upwardly. Hence, sensory portions 20 and 20.1 at the tips of finger 14 and thumb 15 face each other and can actually contact each other.

Channels 17, 18 and 19 respectively include webs 1, 2 and 3 extending between opposite, parallel side walls of each channel. In the open position of finger 14, webs 1–3 are substantially co-planar and are located along the bottoms of the channels to define the object gripping surface of finger 14. Corresponding channels of thumb 15 are positioned so that the object gripping webs are located along the tops of the channels, as illustrated in FIG. 1.

If the artificial hand of FIG. 1 is employed for industrial, robotic purposes, the fingers extending from the bottom of the metacarpal have the same length as the fingers extending from the top of the metacarpal. If, however, the artificial hand is used as a prosthesis, thumb 15 is shorter than fingers 12–14, as illustrated in FIG. 1.

Details of finger 14 and the structure for connecting the finger to metacarpal 16 are illustrated in FIGS. 2, 3, 3A and 4.

Figure 2:
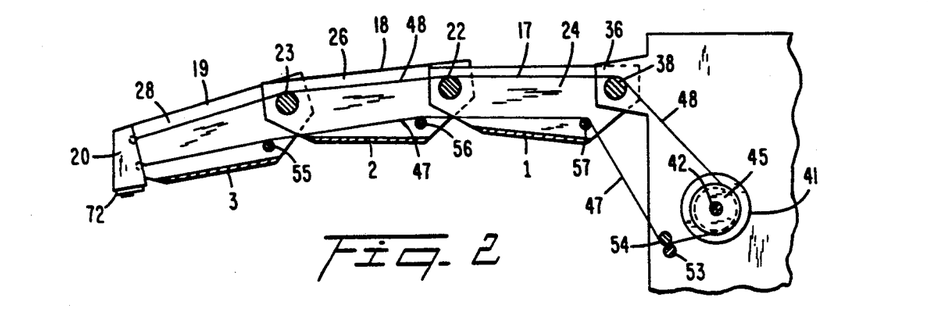
FIG. 2 is a side view of a finger included in the hand of FIG. 1.
Figure 3:
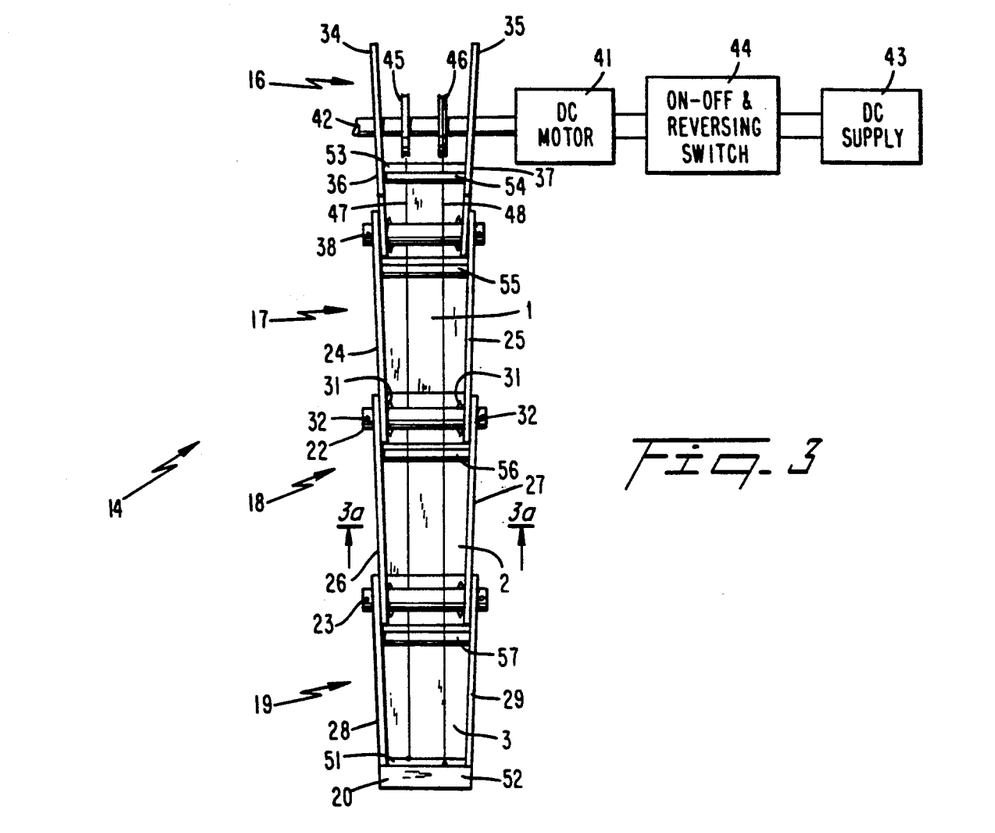
FIG. 3 is a top view of the finger illustrated in FIG. 2.
Figure 3A:
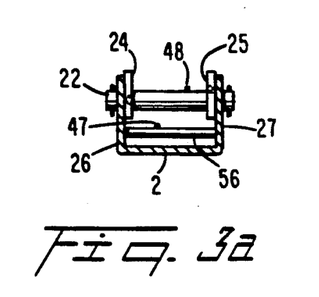
FIG. 3A is a front view, taken through the lines 3A—3A, FIG. 3.

Each of channels 17–19 of finger 14 includes a pair of parallel, elongated side walls joined to each other by webs 1–3 and to the side walls of the adjacent channel by pins 22 and 23. In particular, channel 17 includes side walls 24 and 25, channel 18 includes side walls 26 and 27, while channel 19 includes side walls 28 and 29. Pin 22 extends through circular apertures in the distal ends of walls 24 and 25, as well as through circular apertures in the proximal ends of walls 26 and 27. These circular apertures are aligned with each other to receive pin 22. A similar relationship is provided for pin 23 vis a vis walls 26–29. To prevent substantial transverse motion of pins 22 and 23 relative to the aligned longitudinal axis of channels 17–19 the pins include nibs 31 that are located slightly inside of the side walls of channels 17–19. Walls 24 and 26 are arranged so that the inner face of wall 26 contacts the outer face of wall 24, with the inner face of wall 24 engaging nib 31.

To enable the proximal ends of walls 24 and 25 to be connected to metacarpal 16, the metacarpal includes plates 34 and 35, generally having a rectangular shape. Plates 34 and 35 are respectively approximately coplanar with walls 24 and 25. Plates 34 and 35 include horizontally extending ears 36 and 37, having circular apertures aligned with circular apertures in the proximal ends of walls 24 and 25; these circular apertures receive pin 38, constructed and arranged in the same manner as pins 22 and 23.

Plate 35 carries reversible DC motor 41, having output shaft 42 that extends through an aperture in plate 35. The end of shaft 42 remote from motor 41 is captured in a bearing (not shown) in a recess of plate 34. Motor 41 is connected to DC power supply 43 by on-off and reversing switch 44, controlled by an operator or a computer to selectively supply current in opposite directions to the motor, to control the turning direction of shaft 42.

Figure 5:
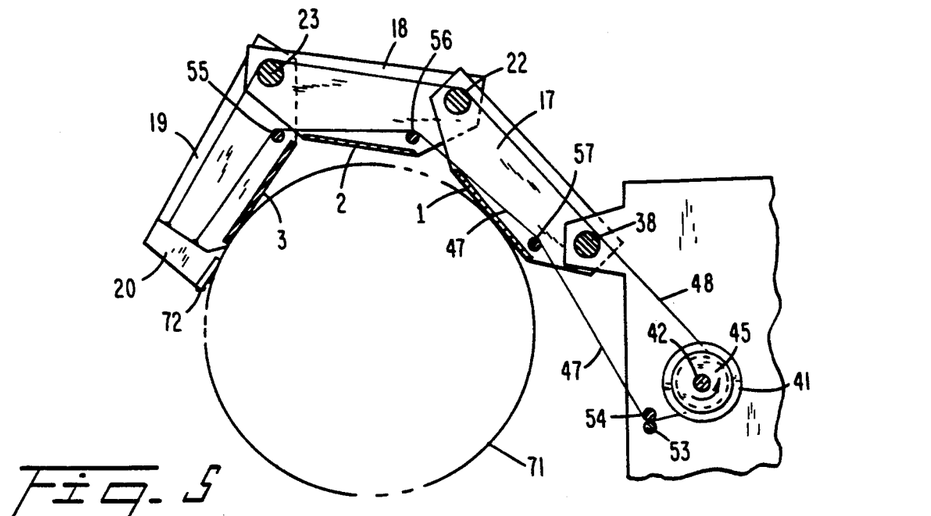
FIG. 5 is a side view of the digit illustrated in FIGS. 2 and 3 while that digit is in a gripping state.

Mounted in side-by-side relation on shaft 42 are reels 45 and 46 on which cables 47 and 48 are respectively wound. The ends of cables 47 and 48 remote from reels 45 and 46 are respectively secured to bottom plate 51 and top plate 52 at the distal end of channel 17, where sensor 20 is located. Cables 47 and 48 are wound in opposite directions on reels 45 and 46 such that cable 47 is wound onto reel 45 from the underside of the reel, while cable 48 is wound onto reel 46 over the upper portion of the reel. Thereby, in response to motor 41 being driven in a first direction, causing reel 45 to be turned in a counterclockwise direction, as illustrated in FIGS. 2 and 5, cable 47 is wound on reel 45 while cable 48 is paid from reel 46. In contrast, in response to DC motor 41 being driven in a second, clockwise direction, cable 47 is paid from reel 45 while cable 48 is wound on reel 46.

To provide the desired movement and object gripping force for channels 17–19, cable 48 extends between reel 46 and plate 52 over each of pins 38, 22 and 23. To control the motion of channels 17–19, cable 47 extends between reel 45 and bottom plate 51 through a nip formed between guide rollers 53 and 54, thence under pin 38, thence over roller bushing 55, thence under pin 22, thence over roller bushing 56, thence under pin 23, thence over roller bushing 57. Pins 22, 23 and 38 are coated with a small coefficient of friction roller bushing material to protect the pins and cable 48. Guide rollers 53 and 54 are mounted on horizontally extending shafts (not shown), carried by bearings in plates 34 and 35, between which the roller guides extend. Similarly, roller bushings 55, 56 and 57 are mounted on horizontally extending shafts that extend between side walls 24 and 25, 26 and 27, and 28 and 29, respectively.

Fingers 12 and 13 are constructed identically to finger 14. Metacarpal 16 includes an additional pair of plates, virtually identical to plates 34 and 35, attached to each of fingers 12 and 13. Longitudinally extending cables in fingers 12 and 13, similar to cables 47 and 48, are wound on reels similar to reels 45 and 46. The reels for fingers 12 and 13 extend between plates in metacarpal 16 corresponding to plates 34 and 35. The reels for the cables of fingers 12 and 13 corresponding to cables 47 and 48 can be driven by motor 41 or each of fingers 12 and 13 can be provided with a separate DC motor, to provide greater flexibility.

Thumb 15 is constructed similarly to fingers 12–14. However, thumb 15 is driven by DC motor 153, different from DC motor 41 which drives finger 14. The opening and closing action of thumb 15 in response to clockwise and counterclockwise drive by motor 53 is the same as the opening and closing action of finger 14. Any other digits that might be mounted on the bottom of metacarpal 16 can be driven by motor 53 or can be provided with separate reversible drive motors.

Figure 4:
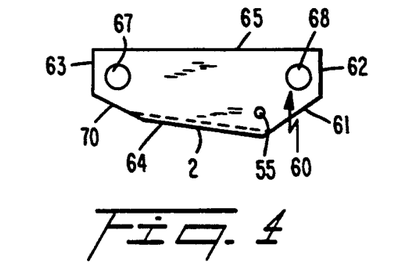
FIG. 4 is a side view of a channel in the digit illustrated in FIGS. 2 and 3.

Reference is now made to FIG. 4, a side view of wall 25 of channel 17. Since each of side walls 24–29 is basically the same, the description of FIG. 4 applies for the side walls of each of channels 17-19. Side wall 25 includes a tapered edge 61 extending downwardly from vertical proximal edge 62 toward vertical distal edge 63. Lower edge 64 extends between tapered edge 61 and distal edge 63. Horizontally extending, upper edge 65 extends from proximal edge 62 toward distal edge 63 while downwardly sloping edge 66 extends between horizontally extending edge 65 and distal edge 63. Wall 25 includes appendage 60, defined by edges 61, 62 and 65, which extends from the right of web 1, as viewed in FIG. 4.

Wall 25 includes circular apertures 67 and 68 through which pins 38 and 22 respectively extend. Aperture 68 is located in appendage 60 in proximity to proximal edge 62 between tapered edge 61 and horizontally extending edge 65, while aperture 67 is located in proximity to distal edge 63, between tapered edge 70 (that extends between bottom edge 64 and distal 63) and top edge 65. Slightly above the intersection of edges 61 and 64 is bushing 55. This particular construction of wall 25 of channel 17 is advantageous because it prevents contact between distal edge 63 and the distal portions of edges 64 and 66 with pin 56 of walls 26 and 27, except along the parallel interior face of wall 27 and the exterior face of wall 25. The tapered, U-shaped channel employed for each phalanx of the finger or thumb causes the phalanges to be stronger and easily manufactured in a single stamping process. From the foregoing the mechanical hand of the invention requires a minimal number of parts, especially compared to artificial hands employing mechanical linkages and/or hydraulic devices.

Figure 6:
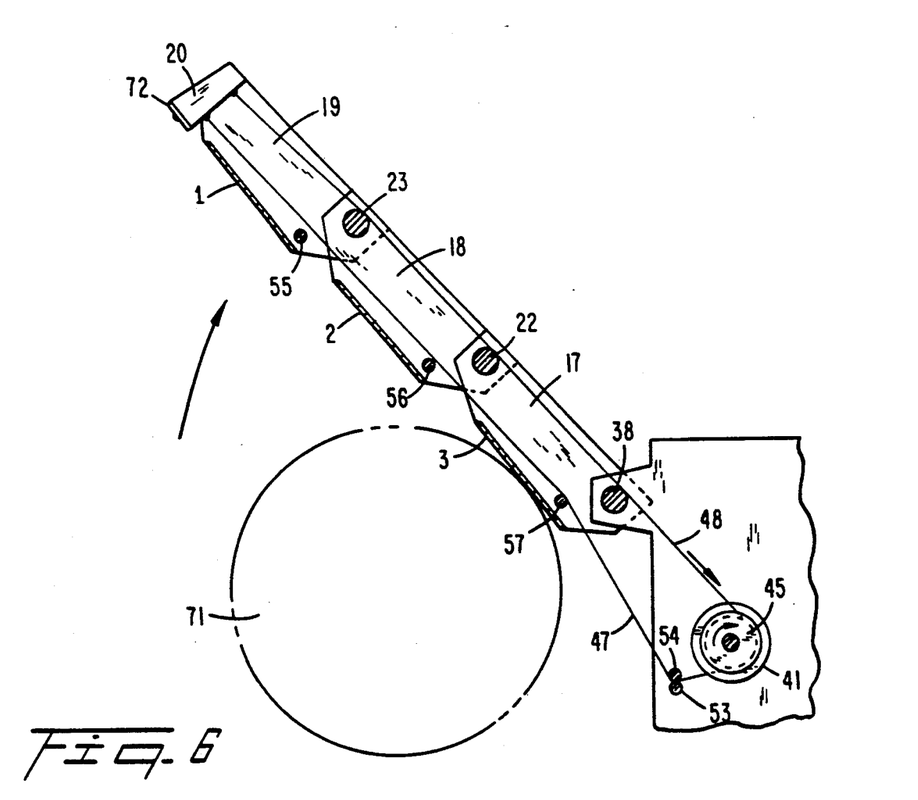
FIG. 6 is a side view of the digit illustrated in FIGS. 2 and 3, while that digit is in an open state.

To provide a better understanding of how hand 11 and finger 14 function, reference is now made to FIGS. 5 and 6. In FIG. 5, finger 14 is illustrated as being closed on cylinder 71. Cylinder 71 is grasped between sensing pad 72, extending from bottom plate 51 of finger 14 and the proximal portion of proximal phalanx 17.

To close finger 14 onto cylinder 71, motor 41 is driven in the first direction, turning reel 45 in the counterclockwise direction, to wind cable 47 on the reel. As cable 47 is being pulled through the nip between guide rollers 53 and 54 and wound on reel 45 in a counterclockwise direction, a tensile force is applied to the cable, causing the bottom surfaces of the cable to engage the top portions of bushings 55, 56 and 57 so the cable exerts a compressive force on the roller bushings. Simultaneously, fingers 12 and 13 as well as thumb 15 and any other digits extending from the lower portions of the plates comprising metacarpal 16 are closed in response to activation of motors 41 and 53 to provide a positive grip on cylinder 71. Motor 41 continues to turn reel 45 in the counterclockwise direction, causing greater tensile force to be applied to cable 47 until a compressive force detected by sensing pad 72 reaches a predetermined level.

In response to the predetermined level of the compressive force being detected by sensing pad 72, a signal is transmitted by sensor 20 to a controller which supplies a signal to on-off and reversing switch 44, to disconnect DC power supply 43 from DC motor 41. Shaft 42 of motor 41 is thereby locked in situ so that cylinder 71 is grasped by finger 14 and other fingers of hand 11.

When it is desired to release cylinder 71 from the grasp of hand 11, fingers 12-14 and thumb 15, or any other digits on the bottom of metacarpal 16 are open, to the position illustrated in FIG. 6. Finger 14 is opened by supplying a signal to switch 44, causing DC motor 41 to drive shaft 42 so that reels 45 and 46 are turned in the opposite, i.e., clockwise, direction from which the motor and reels were turned to close the finger. Turning reels 45 and 46 in the clockwise direction, causes top cable 48 to be wound on reel 46, as bottom cable 47 is paid from reel 45.

In response to switch 44 being activated so that motor 41 is driven by supply 43 in the clockwise direction, causing spool 46 to wind cable 48, a tensile force is applied by the cable to upper plate 52 at the finger tip. This causes bottom surface of cable 48 to engage top surfaces of pins 22, 23 and 38 so the cable applies a compressive force to the pins. Because bottom cable 47 is in a slack position while top cable 48 is taut, channels 17, 18 and 19, corresponding to the proximal, medial and distal phalanges, become aligned, as illustrated in FIG. 6. Simultaneously, motor 53 winds a bottom cable of thumb 15, corresponding with cable 48, causing the thumb to open. Since finger 14 or all of fingers 12-14 open while thumb 15 is opening, cylinder 71 is released from the grip between sensing pad 72 at the tip of finger 20 and the web of channel 17. Opening the fingers and thumb causes cylinder 71 to be released. Because the proximal, medial and distal parts of the finger have a U-shaped cross-section, the proximal portions of webs 2 and 3 engage the distal interior portions of webs 2 and 1, respectively. Thereby, outward movement of channels 17, 18 and 19 is limited to an in-line relationship of these channels.

Figure 7:
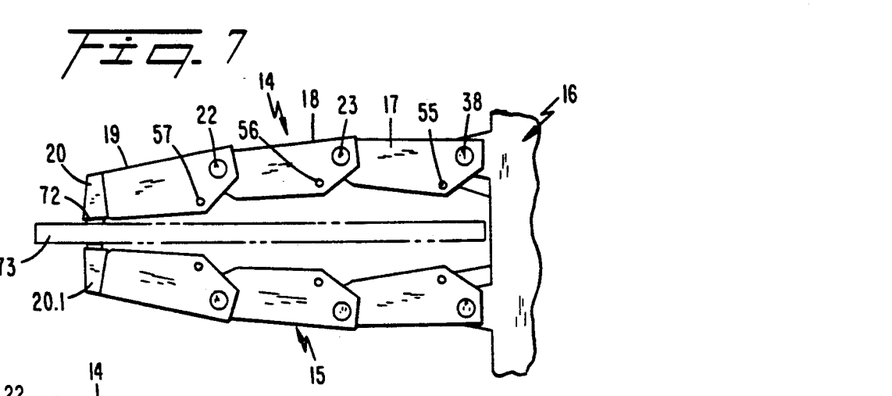
FIG. 7 is a side view of two digits on the hand illustrated in FIG. 1 grasping a flat object.
Figures 8, 9:
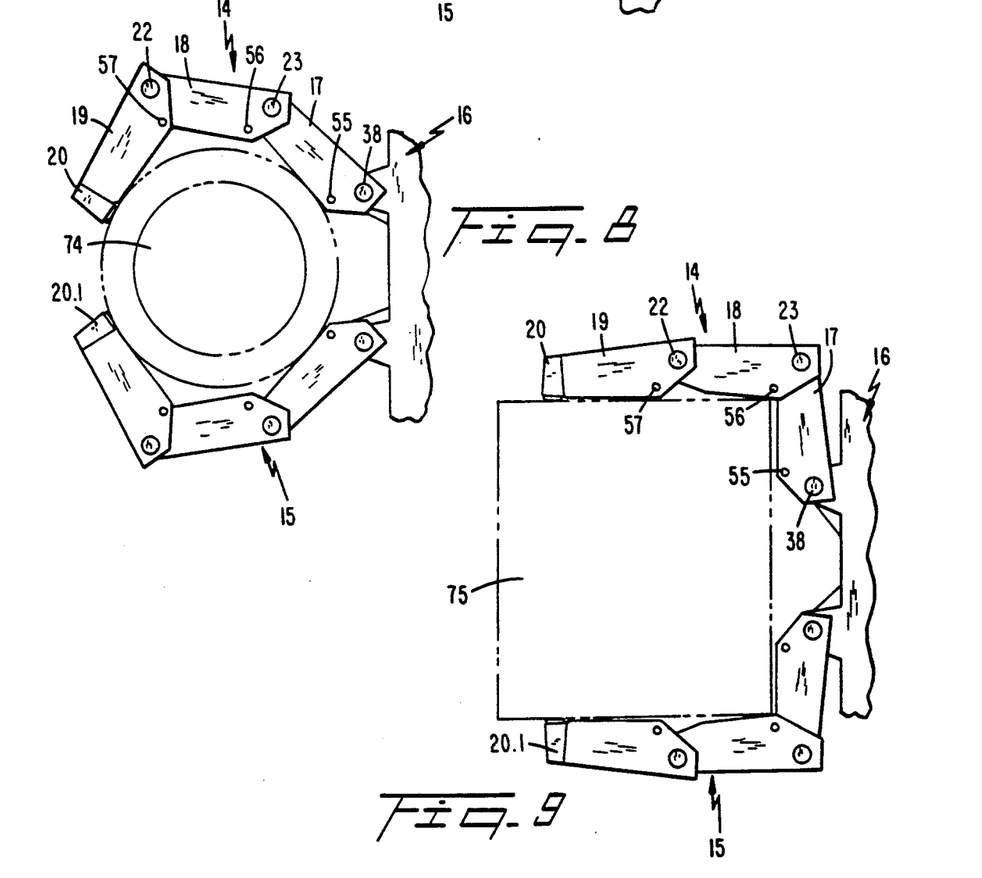
FIG. 8 is a side view of two digits of the hand illustrated in FIG. 1 grasping a round object.
FIG. 9 is a side view of two digits of the hand illustrated in FIG. 1 grasping a square object.

Artificial hand 11 can conform with and grasp irregular shapes, in a manner similar to the manner in which the digits of a human hand grasp and hold such shapes. In FIGS. 7, 8 and 9 are respectively illustrated the position of finger 14 and thumb 15 while grasping flat, round and square objects. As illustrated in FIG. 7, the tips of the distal phalanges of finger 14 and thumb 15 contact opposite sides of flat object 73. It is not necessary for any other portion of object 73 to be touched by any other portion of finger 14 or thumb 15. To grasp round or cylindrical object 74, finger 14 and thumb 15 are activated, as illustrated in FIG. 8, so that the webs of the channels forming the proximal, medial and distal phalanges of the finger and thumb contact the surface of the round or circular object. Approximately the same angle is subtended between the longitudinal axes of each of the phalanges when grasping a round or circular object 74. In contrast, when hand 11 grasps and picks up an object having a square or rectangular cross-section, as illustrated in FIG. 9, the distal and medial phalanges of the finger and thumb have substantially aligned longitudinal axes, at right angles to the longitudinal axis of the proximal phalanges of the digits.

Figure 10:
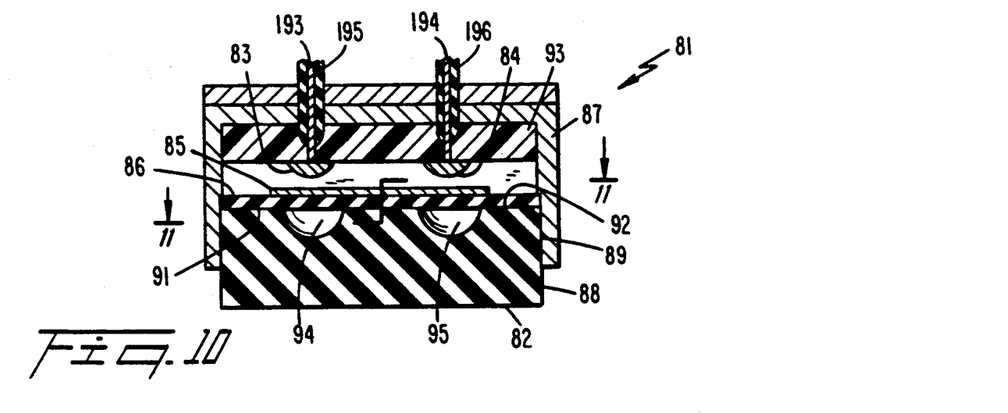
FIG. 10 is a side sectional view of a preferred embodiment of the sensor included at the tip of the digit illustrated in FIGS. 2 and 3.
Figure 11:
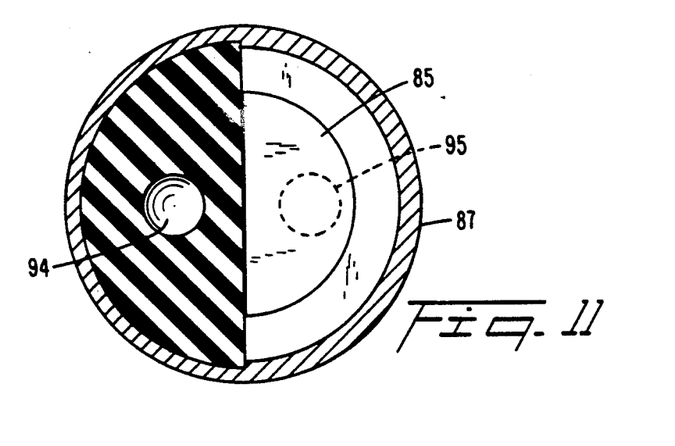
FIG. 11 is a sectional view, taken through the lines 11—11, FIG. 10.

In accordance with a further aspect of the present invention, illustrated in FIGS. 10 and 11, an improved sensor 81 is mounted on the bottom face of plate 51 at the digital tip of channel 19 corresponding with the distal phalanx. Sensor 80 is basically configured as a membrane switch. In response to a force exceeding a predetermined value being exerted against foam rubber pad 82, metal contacts 83 and 84 of the switch are bridged by metal film 85, on taut rubber membrane 86. In the preferred embodiment, membrane 86 carries film 85 and is stretched taut across face 91 of pad 82, to which the membrane is bonded. Foam rubber pad 82 includes cylindrical side wall 88, a portion of which frictionally engages side wall 89 of cup 87 to hold the pad in situ in the cup. Pad 82 is inserted into cup 87 so that upper, generally planar face 91 of the pad is spaced from contacts 83 and 84 by a predetermined distance such that in response to a predetermined force being exerted on the pad the contacts are bridged by film 85.

Contacts 83 and 84 are mounted on dielectric disk 93, bonded to the interior planar face of cup 87. In the normal, open position of membrane switch 81, contacts 83 and 84 are spaced from metal film 85. Contacts 83 and 84 are soldered or otherwise bonded to lead wires 93 and 194 which are surrounded by insulating sleeves 195 and 96, respectively. Lead wires 93 and 94 are connected to suitable electric circuitry which senses when contacts 83 and 84 are closed by film 85 in response to sufficient force being exerted on pad 82 to cause membrane 86 to be deflected to bring film 85 into engagement with contacts 83 and 84. The electric circuitry detects when contacts 83 and 84 are bridged to provide an indication that the predetermined force associated with membrane switch 81 has been reached or exceeded.

Figure 12:
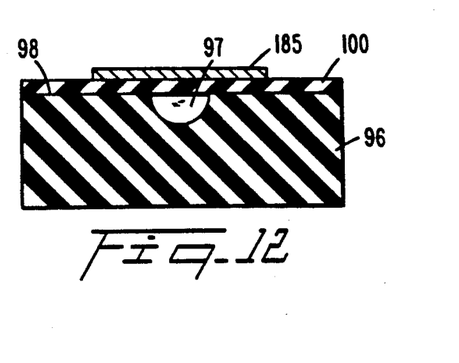
FIG. 12 is a side view of a pad having different characteristics from the pad structure of FIG. 10 and which can be used in the housing of FIG. 10 in lieu of the pad illustrated in FIG. 10.
Figure 13:
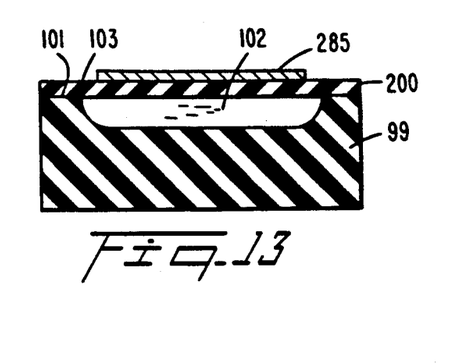
FIG. 13 is a side view of another pad structure which is included in an assemblage of pads accompanying the switch illustrated in FIGS. 10 and 11.

It is possible to vary the force necessary to short circuit contacts 83 and 84 to each other by providing switch 81 with an assemblage of different pads and by interchanging the pads on a selective basis, as a function of the desired predetermined force. Such a result can be attained by providing different pads in the assemblage with different densities, or by providing pads having different surface areas, as illustrated by the assemblage of pads of FIGS. 10, 12 and 13. The pads of FIGS. 10, 12 and 13 are all positioned in cup 87 at the same depth so the initial spacing between the metal films and contacts 83 and 84 is the same for all of the pads in the assemblage.

Pad 82, illustrated in FIG. 10, has a moderate area of surface 91 engaging planar surface 92 of membrane 86. Such a result is provided in pad 82 by cutting two circular depressions 94 and 95 in surface 91. Because the contact area between surfaces 91 and 92 is moderate with pad 82 a moderate force must be applied against pad 82 to cause sufficient pressure to be exerted against membrane 86 to cause film 85 to bridge contacts 83 and 84. In contrast, pad 96, FIG. 12, has a single circular depression 97 in the upper face 98 thereof. The area of depression 97 in face 98 is the same as the area of one of depressions 94 or 95 in surface 91. When pad 96, instead of pad 82, is inserted into cup 87 the contact area between surfaces 98 and 92 is increased significantly. Thereby, a relatively small force against pad 96 causes film 185 (carried by membrane 100) to bridge contacts 83 and 84 when pad 96 is substituted for pad 82. When pad 99, FIG. 13, is used instead of pad 82, the force necessary to deflect membrane 200 to cause film 285 to bridge contacts 83 and 84 is increased relative to the force required to cause film 85 to bridge the contacts. This is because pad 99 has an upper face 101 with a depression 102 having a larger surface area against membrane 103 than the area of depressions 94 and 95 against membrane 86. The use of replaceable pads is also advantageous because the pads can easily be replaced as they wear or harden.

While there has been described and illustrated one specific embodiment of the invention, it will be clear that variations in the details of the embodiment specifically illustrated and described may be made without departing from the true spirit and scope of the invention as defined in the appended claims. For example the digit activating device of the present invention is not limited to anthropomorphic hands, but can be used for any robot claw-manipulator.

I claim:

1. A digit for a robotic hand or a robotic claw manipulator or a prosthetic device comprising guide means and phalanx means between a tip and root of the digit, a tactile sensor, a reversible motor having a shaft, first and second reels on the shaft; first and second cables, said first and second cables having a first end fixedly connected to displaced first and second points on the tip of the digit, respectively, and a second end connected to be driven by said reversible motor shaft; the first ends of the first and second cables being wound in opposite directions on the first and second reels so that in response to said shaft being turned in the first direction by the motor being activated in the first direction the first cable is wound on the first reel and the second cable is paid from the second reel and in response to said shaft being turned in the second direction by the motor being activated in the second direction the second cable is wound on the second reel and the first cable is paid from the first reel, said cables being positioned and connected to (a) said reversible drive means, (b) said first and second points and (c) said guide means, and (a) said phalanx means, (b) said first and second points, (c) said drive means and (d) said guide means being positioned and arranged so that in response to said drive means being activated in a first direction the first cable exerts a tensile force on said first point and a compressive force on the guide means to cause the phalanx means to be urged from a bent position toward a straight position and in response to said drive means being activated in a second direction the second cable exert a tensile force on said second point and a compressive force on the guide means to cause the phalanx means to be urged away from a straight position toward an object being grasped until the compressive force exerted on said object reaches a predetermined level subject to which said tactile sensor is responsive.

2. The digit of claim 1 wherein the phalanx means includes first and second phalanges having adjacent ends connected together by a first pin, said first phalanx being connected by a second pin to a metacarpal means on which said shaft is mounted, said pins being part of said guide means, said first cable extending over said pins and exerting compressive forces against the pins as the shaft and reels are driven in the first direction.

3. The digit of claim 2 wherein the first and second phalanges respectively include first and second rollers displaced from the first and second pins, said second cable extending over said rollers and exerting compressive forces against the rollers as the shaft and reels are driven in the second direction.

4. The digit of claim 3 wherein the second cable extends between the rollers and pins and the guide means includes a pair of guide rollers on the metacarpal means between the shaft and first rollers, the guide rollers having a nip through which the second cable extends.

5. The digit of claim 4 wherein each of the phalanges includes a substantially U-shaped channel with a web connecting a pair of side walls, the web forming a gripping surface for the phalanx.

6. The digit of claim 5 wherein each of said side walls includes an appendage extending beyond the web, the appendages of the first and second phalanges respectively carrying the first and second pins and being arranged so that the webs of the first and second phalanges do not contact each other.

7. The digit of claim 6 wherein said first and second rollers are respectively positioned in proximity to the webs of the first and second phalanges, adjacent said appendages.

8. The digit of claim 3 wherein each of the phalanges includes a substantially U-shaped channel with a web connecting a pair of side walls, the web forming a gripping surface for the phalanx.

9. The digit of claim 8 wherein each of said side walls includes an appendage extending beyond the web, the appendages of the first and second phalanges respectively carrying the first and second pins and being arranged so that the webs of the first and second phalanges do not contact each other.

10. The digit of claim 9 wherein said first and second rollers are respectively positioned in proximity to the webs of the first and second phalanges, adjacent said appendages.

11. The digit of claim 1 wherein the phalanx means includes first, second and third phalanges having adjacent ends connected together by first and second pins, said first phalanx being connected by a third pin to a metacarpal means on which said shaft is mounted, said pins being part of said guide means, said first cable extending over said pins and exerting compressive forces against the pins as the shaft and reels are driven in the first direction.

12. The digit of claim 11 wherein the first, second and third phalanges respectively include first, second and third rollers displaced from the first, second and third pins, said second cable extending over said rollers and exerting compressive forces against the rollers as the shaft and reels are driven in the second direction.

13. The digit of claim 12 wherein the second cable extends between the rollers and pins and the guide means includes a pair of guide rollers on the metacarpal means between the shaft and first rollers, the guide rollers having a nip through which the second cable extends.

14. The digit of claim 1 wherein said tactile sensor is mounted on said tip, said sensor including a deformable membrane having a metallized region on one side thereof, electric contact means normally spaced from said metallized region, a pad having a first surface contacting the other side of said membrane, the pad having a second surface opposite the first surface, the second surface being responsive to forces exerted on the tip so that in response to an object being grasped by the hand the sensor is responsive to forces exerted on the tip by the object, the pad being arranged so that, in response to the force exceeding a predetermined value, the membrane is deflected to cause the metallized region to contact the electric contact means.

15. The digit of claim 14 further including an assemblage of a plurality of said pads, said pads and a housing for said sensor being arranged so that different pads in the assemblage can be mounted in the housing, different ones of said pads having different force responsive characteristics so that the predetermined value of the force changes as a function of which pad in the assemblage is mounted in the housing.

16. The digit of claim 15 wherein one of said sides of different ones of said pads have different surface areas to control the predetermined value of the force.

17. The digit of claim 15 wherein different ones of said pads have different density characteristics to control the predetermined value of the force.

18. The digit of claim 1 wherein the phalanx means includes plural phalanges having aligned longitudinal axes, each of the phalanges including: a channel having two opposed parallel side walls connected to each other by a web, each of said side walls having an appendage extending beyond the wall, the appendage including an edge extending in a tapered fashion away from the web, the appendage being pinned to a region of the side wall of the adjacent channel in proximity to an end of the web of the adjacent channel remote from the appendage of the adjacent side channel, the channels being arranged so that the webs of the adjacent channels do not contact each other.

19. A robotic hand or a robotic claw manipulator or a prosthetic device comprising an articulated digit having plural phalanges, adjacent ends of the phalanges being connected together by a pin, a roller on each of said phalanges, a tactile sensor on the tip of said phalanges, a root of the digit being on one of the phalanges and connected by another pin to a metacarpal said pins and rollers for each digit having parallel axes, the metacarpal including a reversible motor having a shaft and a pair of fixedly mounted guide rollers having a nip; a first cable extending between a first point on the tip and the shaft through the nip between one side of each of the pins and a side of the rollers facing said one side of the pins, a second cable extending between a second point on the tip and the shaft over a second side of each of the pins, the first and second sides being opposite to each other, said first point, rollers, plalanges, nip and shaft being positioned and arranged so that, in response to the shaft being turned in a first direction, the first cable exerts a tensile force on the first point and a compressive force on the rollers to cause the digit to be urged toward a bent position until said tactile sensor detects the compressive force exerted on an object being grasped up to a predetermined value; said second point, pins, phalanges and shaft being positioned and arranged so that, in response to the shaft being turned in a second direction, the second cable exerts a tensile force on the second point and a compressive force on the pins to cause the digit to be urged toward an open position.

20. The hand of claim 19 wherein the first point and nip are on the same side of the digit as the first side of the guide rollers, the second point being on the same side of the digit as the second side of the guide rollers.

21. The digit of claim 20 further including first and second reels on the shaft, the first cable being wound on the first reel and being paid from the same side of the first reel as the first side of said pins, the second cable being connected to the second reel and being paid from the same side of the second reel as the second side of said pins.

22. The digit of claim 19 further including a second articulated digit mounted on the metacarpal in facing relationship with the first named digit, said second digit including plural second phalanges, adjacent ends of the second phalanges being connected together by a second pin, a root of the second digit being on one of the phalanges of the second digit and connected to the metacarpal, a second roller on each of said second phalanges, said second pins and second rollers for the second digit having second parallel axes; the metacarpal further including a second reversible motor having a second shaft and a second pair of fixedly mounted guide rollers having a second nip; a third cable extending between a third point on the second tip and the second shaft through the second nip between one side of each of the second pins and a side of second rollers facing said one side of the second pins, a fourth cable extending between a fourth point on the second tip and the second shaft over a second side of each of the second pins, the first and second sides of the second pins being opposite to each other, said third point, second rollers, second phalanges, second nip and second shaft being positioned and arranged so that, in response to the second shaft being turned in a first direction, the third cable exerts a tensile force on the third point and a compressive force on the second rollers to cause the second digit to be urged toward a bent position; said fourth point, second pins, second phalanges and second shaft being positioned and arranged so that, in response to the second shaft being turned in a second direction, the fourth cable exerts a tensile force on the fourth point and a compressive force on the second pins to cause the second digit to be urged toward an open position.

23. An artificial hand comprising a metacarpal, first and second opposed digits extending from said metacarpal, first and second reversible drive means on the metacarpal for respectively driving the first and second digits, each of said digits including: guide means and phalanx means between a tip and root of the digit, first and second cables, said first and second cables having a first end fixedly connected to displaced first and second points on the tip of the digit, respectively, each of said cables having a second end connected to be driven by said reversible drive means for the associated digit; said cables being positioned and connected to (a) said associated reversible drive means, (b) said first and second points and (c) said guide means, and (a) said phalanx means, (b) said first and second points, (c) said associated drive means and (d) said guide means being positioned and arranged so that in response to said associated drive means being activated in a first direction the first cable exerts a tensile force on said first point and a compressive force on the guide means to cause the phalanx means to be urged from a bent position toward a straight position and in response to said associated drive means being activated in a second direction the second cable exerts a tensile force on said second point and a compressive force on the guide means to cause the phalanx means to be urged away from a straight position, the compressive forces being exerted in the same direction, the tip of each digit including a tactile sensor, each of said tactile sensors including: a deformable membrane having a metallized region on one side thereof, electric contact means normally spaced from said metallized region, a pad having a first surface contacting the other side of said membrane, the pad being positioned on the tip and having a second surface opposite the first surface, the second surface being responsive to forces exerted on the tip so that in response to an object being grasped by the hand the sensor is responsive to forces exerted on the tip by the object, the pad being arranged so that, in response to the force exceeding a predetermined value, the membrane is deflected to cause the metallized region to contact the electric contact means and therefore instructs an on-off switch to shut off a DC motor.

24. The hand of claim 23 further including an assemblage of a plurality of said pads, said pads and a housing for said sensor being arranged so that different pads in the assemblage can be mounted in the housing, different ones of said pads having different force responsive characteristics so that the predetermined value of the force changes as a function of which pad in the assemblage is mounted in the housing.

25. The hand of claim 24 wherein one of said sides of different ones of said pads have different surface areas to control the predetermined value of the force.

26. A digit for an artificial hand comprising an elongated bendable structure including a root and a tip, means for controllably manipulating said structure so said tip is bent relative to said root, a tactile sensor in said tip, said tactile sensor including: a deformable membrane having a metallized region on one side thereof, electric contact means normally spaced from said metallized region, a pad having a first surface contacting the other side of said membrane, the pad being positioned on the tip and having a second surface opposite the first surface, the second surface being responsive to forces exerted on the tip so that in response to an object being grasped by the hand the sensor is responsive to forces exerted on the tip by the object, the pad being arranged so that, in response to the force exceeding a predetermined value, the membrane is deflected to cause the metallized region to contact the electric contact means.

27. The digit of claim 26 further including an assemblage of a plurality of said pads, said pads and a housing for said sensor being arranged so that different pads in the assemblage can be mounted in the housing, different ones of said pads having different force responsive characteristics so that the predetermined value of the force changes as a function of which pad in the assemblage is mounted in the housing.

28. The digit of claim 27 wherein one of said sides of different ones of said pads have different surface areas to control the predetermined value of the force.

29. The digit of claim 28 wherein different ones of said pads have different density characteristics to control the predetermined value of the force.

30. A digit for an artificial hand comprising plural phalanges having aligned longitudinal axes and adjacent ends pinned together, means for controllably manipulating said phalanges so a tip of the digit is bent relative to a root of the digit, each of the phalanges comprising a channel having two opposed parallel side walls connected to each other by a web, each of said side walls having an appendage extending beyond the wall, the appendage including an edge extending in a tapered fashion away from the web, the appendage being pinned to a region of the side wall of the adjacent channel in proximity to an end of the web of the adjacent channel remote from the appendage of the adjacent side channel, the channels being arranged so that the webs of the adjacent channels do not contact each other.

31. A digit for robotic hand or a robotic claw manipulator or a prosthetic device comprising guide means and phalanx means between a tip and root of the digit, reversible drive means, first and second cables, said first and second cables having a first end fixedly connected to displaced first and second points on the tip of the digit, respectively, and a second end connected to be driven by said reversible drive means; said cables being positioned and connected to (a) said reversible drive means, (b) said first and second points and (c) said guide means, and (a) said phalanx means, (b) said first and second points, (c) said drive means and (d) said guide means being positioned and arranges so that in response to said drive means being activated in a first direction the first cable exerts a tensile force on said first point and a compressive force on the guide means to cause the phalanx means to be urged from a bent position toward a straight position and in response to said drive means being activated in a second direction the second cable exerts a tensile force on said second point and a compressive force on the guide means to cause the phalanx means to be urged away from a straight position, a tactile sensor mounted on said tip, said sensor including a deformable membrane having a metallized region on one side thereof, electric contact means normally spaced from said metallized region, a pad having a first surface contacting the other side of said membrane, the other side of the membrane being opposite said one side of the membrane, the pad having a second surface opposite the first surface, the second surface being responsive to forces exerted on the tip so that in response to an object being grasped by the hand the sensor is responsive to forces exerted on the tip by the object, the pad being arranged so that, in response to the force exceeding a predetermined value, the membrane is deflected to cause the metallized region to contact the electric contact means, and curb further bending movement of said digit toward an object being grasped.

32. A digit for a robotic hand or a robotic claw manipulator or a prosthetic device comprising guide means and phalanx means between a tip and root of the digit, a tactile sensor on the tip, reversible drive means, first and second cables, said first and second cables having a first end fixedly connected to displaced first and second points on the tip of the digit, respectively, and a second end connected to be driven by said reversible drive means; said cables being positioned and connected to (a) said reversible drive means, (b) said first and second points and (c) said guide means, and (a) said phalanx means, (b) said first and second points, (c) said drive means and (d) said guide means being positioned and arranged so that in response to said drive means being activated in a first direction the first cable exerts a tensile force on said first point and a compressive force on the guide means to cause the phalanx means to be urged from a bent position toward a straight position and in response to said drive means being activated in a second direction the second cable exerts a tensile force on said second point and a compressive force on the guide means to cause the phalanx means to be urged away from a straight position toward an object being grasped until the compressive force exerted on said object reaches a predetermined level substantially controlled by said sensor, the phalanx means including plural phalanges having aligned longitudinal axes, each of the phalanges including: a channel having two opposed parallel side walls connected to each other by a web, each of said side walls having an appendage extending beyond the wall, the appendage including an edge extending in a tapered fashion away from the web, the appendage being pinned to a region of the side wall of the adjacent channel in proximity to an end of the web of the adjacent channel remote from the appendage of the adjacent channel, the channels being arranged so that the webs of the adjacent channels do not contact each other.

* * * * *